United States Patent [19]

Lorenz

[11] 4,193,173

[45] Mar. 18, 1980

[54] CLAMP ASSEMBLY

[76] Inventor: Edwin W. Lorenz, 757 Murray Crescent, Cobourg, Ontario, Canada

[21] Appl. No.: 842,879

[22] Filed: Oct. 17, 1977

[51] Int. Cl.² .......................................... A44B 21/00
[52] U.S. Cl. ................... 24/249 LS; 24/285; 151/22; 220/327; 292/256.75
[58] Field of Search .................. 24/285, 279, 249 LS; 285/419; 151/22; 138/159; 220/325, 327; 292/256.75, 256.73; 114/203

[56] References Cited

U.S. PATENT DOCUMENTS

| | | | |
|---|---|---|---|
| 167,262 | 8/1875 | Lewis | 24/285 |
| 649,916 | 5/1900 | Dietrich | 24/279 |
| 802,138 | 10/1905 | Byshe | 151/14 R |
| 1,070,128 | 8/1913 | Gross | 292/256.75 |
| 1,381,437 | 6/1921 | Smith | 85/35 |
| 1,391,810 | 9/1921 | Vessey | 85/35 |
| 1,698,685 | 1/1929 | Spencer | 85/35 |
| 1,749,122 | 3/1930 | Beasely | 220/327 |
| 1,883,041 | 10/1932 | Somers | 24/285 |
| 2,069,552 | 2/1937 | Mikuzasek | 24/285 |
| 2,113,776 | 4/1938 | Smith | 292/256.85 |
| 2,120,211 | 6/1938 | Cornell | 24/249 LS |
| 2,842,180 | 7/1958 | Brown | 151/22 |
| 3,492,841 | 2/1970 | Ipri | 85/35 |
| 3,756,640 | 9/1973 | Johnson | 292/256.75 |
| 3,907,338 | 9/1975 | Hayes | 24/249 LS |

FOREIGN PATENT DOCUMENTS

| | | | |
|---|---|---|---|
| 510406 | 2/1955 | Canada . | |
| 535552 | 1/1957 | Canada | 292/256.75 |
| 1930185 | 1/1971 | Fed. Rep. of Germany | 220/327 |
| 564377 | 12/1923 | France | 85/35 |
| 9375 | of 1892 | United Kingdom . | |
| 185212 | 8/1922 | United Kingdom | 24/279 |

Primary Examiner—Mervin Stein
Attorney, Agent, or Firm—Stevens, Davis, Miller & Mosher

[57] ABSTRACT

This invention provides improved apparatus for clamping together a pair of flanges of a processing vessel. The apparatus includes an elongated tubular stem having a handle at one end thereof for applying torque to the stem. Means defining a surface at the other end of the stem for engaging one of the pair of flanges in the clamping position of the apparatus is provided together with means defining screw threads on at least a portion of the interior of the tubular stem. An elongated threaded stud is at least partially received in the threads of the tubular stem. The end of the stud remote from the stem has a pivot axis defining means thereon for pivotally connecting the stud to the other one of the flanges of the processing vessel.

5 Claims, 5 Drawing Figures

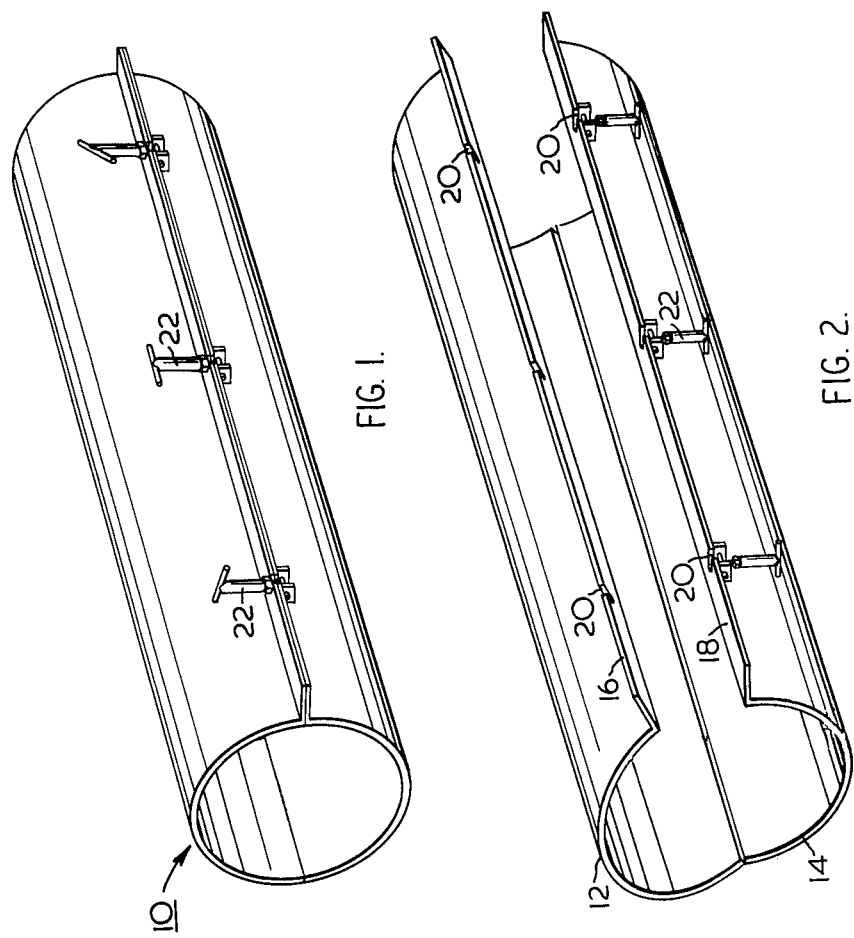

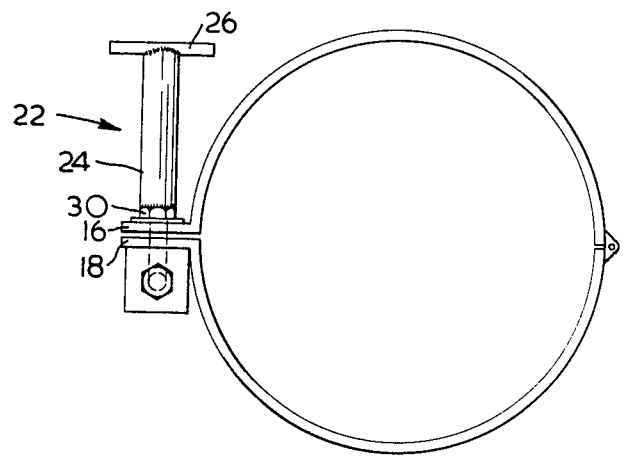
FIG. 3
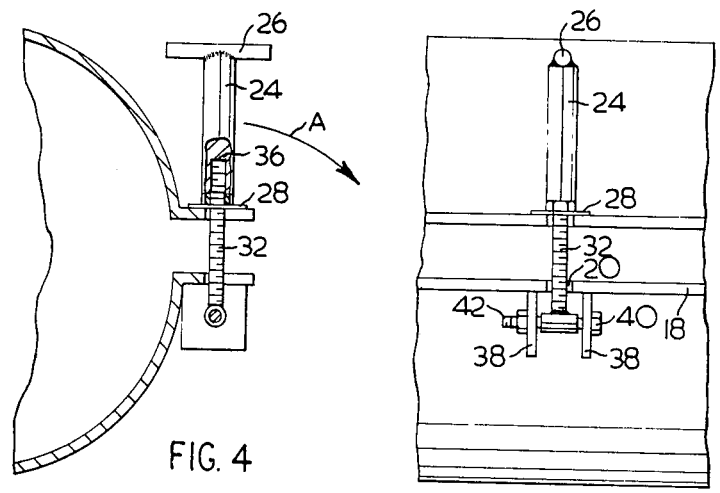
FIG. 4
FIG. 5

CLAMP ASSEMBLY

This invention relates to improvements in clamping apparatus.

The prior art provides many different types of clamps having utility in applications where it is important to open and close the clamp with a minimum of hand and/or tool operations. Such clamps have been used in a variety of situations as, for example, in connection with the closure of access doors of processing vessels. Perhaps the best known type of clamping device is the simple nut and bolt clamp which, however, requires substantial time and effort to remove the bolt from the nut and, of course, the converse, and also necessitates the use of wrenches. This form of clamp, in addition to the time and effort involved, is also unsatisfactory since many union agreements permit only maintenance men to use tools such as wrenches. Thus, if some form of breakdown occurs or if some problem occurs in the processing equipment, the operators cannot open the equipment up for inspection or clearing of jammed material etc. Rather, a maintenance crew must be called in to open the vessel and to permit inspection of same.

In more recent years, various types of toggle clamps have been devised which are simpler to operate than nut and bolt clamps; however, these toggle clamps employ relatively complex mechanisms which increase the initial cost of the clamp and, in addition, are subject to wear and damage. Furthermore, the use of certain types of clamps is frowned upon in certain of the food processing industries because certain types of clamps are designed such that they tend to collect spilled food or other foreign material thereon thus resulting in a build-up of bacteria.

The present invention serves to overcome many of the problems inherent in the prior art by providing improved apparatus for clamping together a pair of flanges of a processing vessel. The apparatus includes an elongated tubular stem having a handle at one end thereof for applying torque to the stem means. Means defining a surface at the other end of the stem for engaging one of the pair of flanges in the clamping position of the apparatus is provided together with means defining screw threads on at least a portion of the interior of the tubular stem. An elongated threaded stud is at least partially received in the tubular stem with the threads thereof engaging with the screw threads of the tubular stem. The end of the stud remote from the stem has a pivot axis defining means thereon for pivotally connecting the stud to the other one of the flanges of the processing vessel.

In the preferred form of the invention the end of the stud located within the tubular stem has means thereon preventing the disengagement of the stud from the stem. By virtue of this arrangement, the possibility of misplacing or losing parts of the clamp assembly while out of use is very much reduced.

The elongated tubular stem serves several important functions. Firstly, the elongated stem provides the operator with additional leverage and is very useful when there is misalignment between the cover and the vessel. In addition, the elongated tubular stem provides clearance between the operator's hand when he is grasping the handle to tighten or loosen the clamp thus avoiding contact of the operator's hand with hot processing machinery and the like. In addition, the tubular stem serves as an enclosure for the elongated threaded stud. With the threads being thus covered they cannot collect food and bacteria thus making the assembly more sanitary and better adapted than prior art clamps for use in certain areas such as in the food processing industries. Furthermore, by enclosing the threads of the stud, damage thereto is eliminated thus increasing the life of the clamp.

Furthermore, in a preferred form of the invention, the above mentioned stem and handle together define a T-shaped configuration with the handle comprising the head of the T. The handle is made sufficiently large as to enable the operator to grasp same firmly and apply the required amount of torque thereto.

The above mentioned defining the flange engaging surface may comprise a disc member secured to said other end of the stem and having an outside diameter greater than the greatest diameter of the stem.

The above mentioned pivot axis defining means may comprise a sleeve welded or otherwise firmly secured to the end of the stud with such sleeve defining a pivot axis at right angles to the longitudinal axis of the stud.

The invention, in a further aspect, relates to a process vessel having a pair of separable flanges, one of the flanges being on the body of the vessel and the other flange being on a removable access port or cover for such vessel. The vessel is provided with a clamping apparatus as recited above including means on said other one of the flanges for attachment to the pivot axis defining means of the stud. Both of the flanges are notched or otherwise slotted at the position where the clamp is located to receive the stud in the clamping position of the clamping apparatus with the flange engaging surface engaging said one of the flanges in the clamping position and the pivot means permitting the clamping assembly to be swung thereabout to a non-clamping position after the stem has been rotated to relieve the clamping pressure on the flanges.

The various advantages and features of the invention will be better understood from the following description of a preferred embodiment thereof wherein reference is made to the drawings in which:

FIG. 1 is a perspective view of a portion of a processing vessel having a plurality of clamping devices in accordance with the invention associated therewith, the clamping devices being shown in the clamping positions;

FIG. 2 is a perspective view similar to that of FIG. 1 but with the access cover shown in the "open" position and the clamping assemblies swung downwardly to the non-clamping positions;

FIG. 3 is an end elevation view of the processing vessel shown in FIG. 1 with the clamping device being shown in the clamped position;

FIG. 4 is a view similar to that of FIG. 3 but with a portion of the structure cut away so as to show the structure of the clamping arrangement more clearly;

FIG. 5 is a side elevation view taken at right angles to the view shown in FIG. 3.

With reference now to the drawings, FIGS. 1 and 2 show a portion of a processing vessel in the closed, clamped position and in the open, non-clamping position respectively. The precise nature of the processing vessel is, of itself, of no significance insofar as the present invention is concerned. The portion of the vessel shown in FIGS. 1 and 2 may, for example, serve to house a screw-conveyor for the movement of food products therealong.

The vessel, which is designated by the numeral 10, is provided with a hinged cover 12. Both the hinged cover 12 and the body portion 14 of the vessel are provided with mating flanges 16 and 18 respectively which project outwardly from the vessel in parallel mating relationship as shown in FIG. 1. Each of the flanges 16 and 18 are provided with a plurality of spaced apart notches 20 therein which align with one another in the closed position as shown in FIG. 1. A clamping assembly 22 is positioned to correspond with the mating notches 20 referred to above.

As best seen in FIGS. 3–5, each of the clamping assemblies 22 include an elongated tubular stem 24. A handle 26 is welded to one end of the stem 24 for applying torque thereto; it will be noted that the stem and the handle together define a T-shaped configuration with handle 26 comprising the head of the T. At the opposite end of the stem 24 there is defined means for engaging one of the flanges i.e. flange 16 in the clamping position of the apparatus. This flange engaging surface is defined by a disc-like element 28 welded or otherwise suitably affixed to the end of the stem opposite the handle 26. It will be seen that the disc 28 has an outer diameter greater than the diameter of the tubular stem.

As noted previously means are provided defining screw threads on at least a portion of the interior of the tubular stem. These screw threads may be provided by machining a portion of the interior of the stem but, more conveniently, the lower end of the stem adjacent the disc element 28 may be defined by an internally threaded nut 30 welded to the remaining portion of the stem. In this case, the nut 30 effectively becomes a part of the stem per se.

An elongated threaded stud 32 is at least partially received in the tubular stem 24 with the threads of the stud engaging with the screw threads of the tubular stem 24. The end of the stud 32 remote from the stem is provided with a sleeve 34 firmly welded thereto and defining a pivot axis at right angles to the longitudinal axis of stud 32. The opposite end of stud 32 located within tubular stem 24 is provided with means thereon preventing the disengagement of stud 32 from stem 24. These means, designated by reference numeral 36, may comprise weld material applied to the inner end of the stud to prevent removal thereof from the stem; alternatively, the threads of the stud may be mutilated in such a way as to prevent the removal of the stud.

The clamping assembly is conveniently connected to the processing vessel by means of spaced apart lugs 38 welded to flange 18 of the processing vessel on opposing sides of each of the notches 20. The lugs 38 are provided with suitably sized apertures and, during assembly of the clamping device, the above mentioned sleeve 34 attached to the end of the threaded stud 32 is positioned between lugs 38 and a bolt passed through the apertures in the lug and through the sleeve 34 with the bolt being thereafter secured in position by means of a nut 42. Thus, by virtue of the bolt 40, the clamping assemblies may be readily swung from the upright clamping positions shown in FIG. 1, downwardly to the released or non-clamping positions.

The operation of the clamping device is very simple. It will be assumed that the clamping assemblies 22 are in the clamping positions as shown in FIG. 1. Assuming that the operator wishes to inspect the interior of the processing vessel, he grasps the handle 26 of the clamping assembly and rotates the same thereby to loosen the clamp sufficiently as to enable the clamp assembly to be pivoted downwardly in the direction shown by arrow A in FIG. 4. This process is repeated for each of the clamp assemblies 22 in turn.

When it is desired to clamp the cover or access door of the processing vessel, the above described procedure is repeated. The several clamping assemblies are swung upwardly until the threaded stud 32 is received in the aligned notches 20 of the upper and lower flanges 16 and 18. Quite often, it may happen that due to some damage to the cover or to the hinges, the notches 20 may not be in exact alignment and in this event, the elongated tubular stem provides the operator with considerable leverage thus assisting him in properly positioning the threaded stud in the notches. After the clamping assembly has been placed in this position as shown in FIGS. 4 and 5, the operator rotates the stem 24 by grasping the handle 26 thereby tightening the clamping assembly to bring the flanges 16 and 18 closely together as shown in FIGS. 1 and 3.

I claim:

1. Apparatus for clamping together a pair of flanges of a processing vessel comprising: an elongated tubular stem, a handle at one end of said stem for applying torque thereto, means defining a surface at the other end of the stem for engaging one of the pair of flanges in the clamping position of said apparatus, means defining screw threads on a portion of the interior of the tubular stem adjacent said other end thereof, an elongated threaded stud at least partially disposed within said tubular stem with the threads thereof engaging with the screw threads of the tubular stem, the stud being freely rotatable relative to said stem so that on relative rotation between them the stud is screwed inwardly or outwardly of the stem, the end of said stud remote from said stem having pivot axis defining means thereon defining a pivot axis at right angles to the longitudinal axis of said threaded stud for pivotally connecting said stud to the other one of the flanges of the processing vessel, and the end of the said stud located within said tubular stem having means thereon adapted to come into interference with the threaded portion of the stem when an attempt is made to substantially completely unscrew the stud from the stem thus preventing the disengagement of the stud from the stem.

2. Apparatus according to claim 1 wherein said stem and said handle together define a T-shaped configuration, said handle comprising the head of the T.

3. Apparatus according to claim 1 wherein the means defining the flange engaging surface comprises a disc member secured to said other end of the stem and having an outside diameter greater than the greatest diameter of the stem.

4. Apparatus according to claim 1 wherein said pivot axis defining means comprises a sleeve.

5. A process vessel having a pair of separable flanges, one of the flanges being on the body of the vessel and the other flange being on an access port thereof in combination with clamping apparatus according to claim 1 including means on said other one of said flanges for attachment to the pivot axis defining means of said stud, both of said flanges being notched to receive the stud therein in the clamping position of the clamping apparatus with said flange engaging surface engaging said one of the flanges in said clamping position, and said pivot axis defining means permitting the clamping apparatus to be swung thereabout to a non-clamping position after said stem has been rotated to relieve the clamping pressure on said flanges.

* * * * *